(12) United States Patent
Juan et al.

(10) Patent No.: US 8,242,668 B2
(45) Date of Patent: Aug. 14, 2012

(54) LIGHT SOURCE MODULE HAVING AIRFLOW CHANNELS IN A HEAT DISSIPATION ELEMENT

(75) Inventors: Chen-Tsun Juan, Miao-Li County (TW); Bor-Bin Chou, Miao-Li County (TW); Li-Wen Chang, Miao-Li County (TW)

(73) Assignee: Young Lighting Technology Inc., Hsin-Chu (TW)

( * ) Notice: Subject to any disclaimer, the term of this patent is extended or adjusted under 35 U.S.C. 154(b) by 380 days.

(21) Appl. No.: 12/616,118

(22) Filed: Nov. 10, 2009

(65) Prior Publication Data
US 2010/0164345 A1    Jul. 1, 2010

(30) Foreign Application Priority Data
Dec. 26, 2008   (TW) .............................. 97151126 A

(51) Int. Cl.
*H01J 7/26* (2006.01)
*H01J 7/24* (2006.01)
*H01J 61/52* (2006.01)
*G09F 13/08* (2006.01)

(52) U.S. Cl. ............ 313/36; 313/46; 313/582; 362/97.2
(58) Field of Classification Search ............ 313/45, 313/46, 582, 35, 36; 349/67; 362/97.2
See application file for complete search history.

(56) References Cited

U.S. PATENT DOCUMENTS

| | | | |
|---|---|---|---|
| 5,971,566 A * | 10/1999 | Tani et al. | 362/294 |
| 7,133,281 B2 | 11/2006 | Bae | |
| 2004/0080925 A1* | 4/2004 | Moon | 362/29 |
| 2004/0119411 A1* | 6/2004 | Fran et al. | 313/607 |
| 2006/0082271 A1* | 4/2006 | Lee et al. | 313/35 |
| 2007/0139962 A1* | 6/2007 | Han | 362/613 |
| 2007/0222388 A1* | 9/2007 | Ting et al. | 313/634 |

FOREIGN PATENT DOCUMENTS
TW   M335701   7/2008

* cited by examiner

*Primary Examiner* — Nimeshkumar Patel
*Assistant Examiner* — Steven Horikoshi
(74) *Attorney, Agent, or Firm* — Jianq Chyun IP Office

(57) ABSTRACT

A light source module including a planar light source, a heat dissipation medium, and a heat dissipation element are disclosed. The planar light source includes a light box, electrodes, and an insulation layer. The light box has a light emitting surface and a bottom surface opposite to the light emitting surface. The electrodes and the insulation layer are disposed on the bottom surface, and the insulation layer covers the electrodes. The heat dissipation medium is disposed on the insulation layer. The heat dissipation element includes conductive contact portions contacting the heat dissipation medium and a conductive connection portion connecting the conductive contact portions, wherein the orthographic projections of the conductive contact portions and the orthographic projections of the electrodes on the bottom surface are not overlapped by each other, and airflow channels are formed between the conductive contact portions, the conductive connection portion, and the heat dissipation medium.

12 Claims, 1 Drawing Sheet

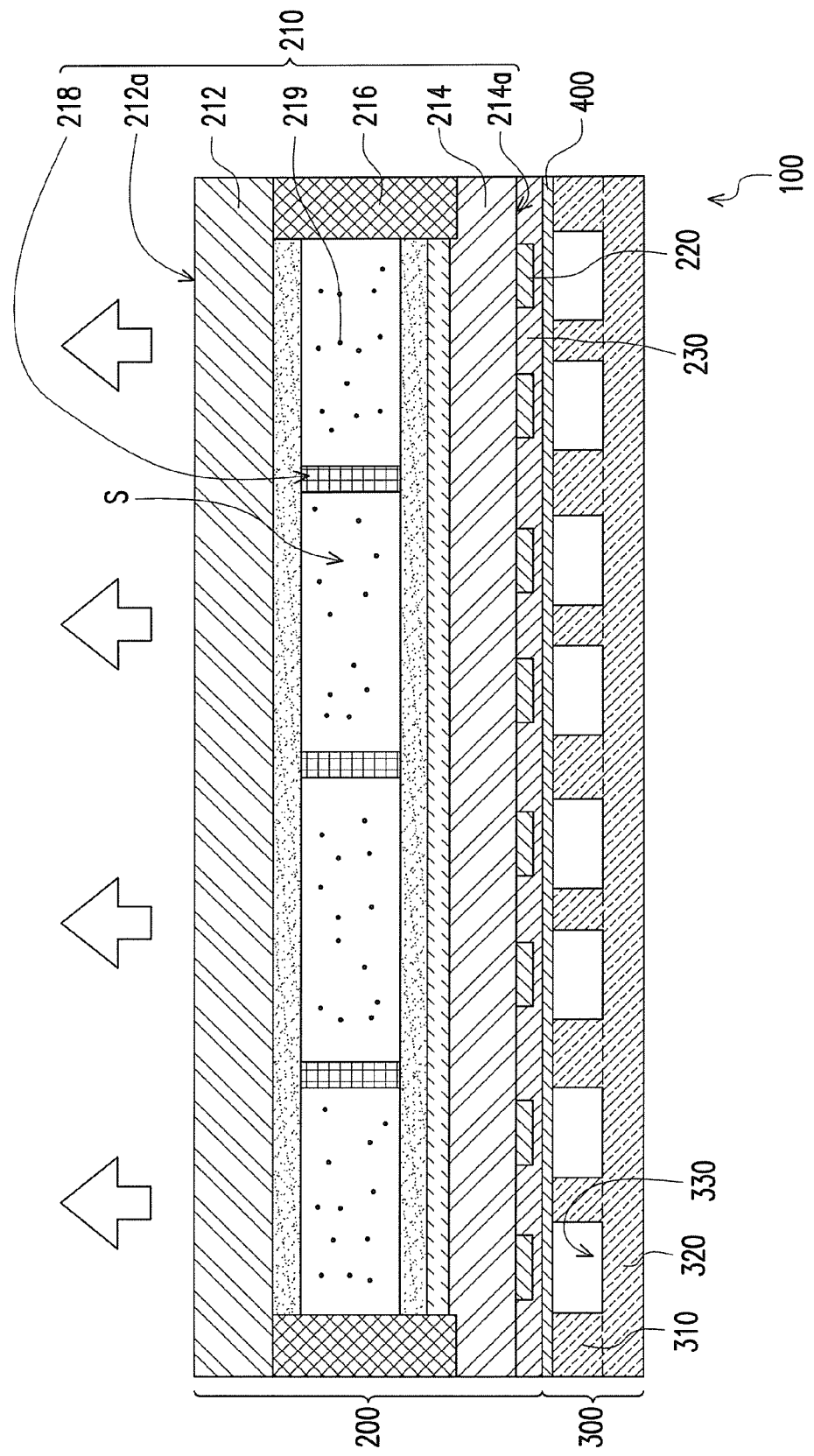

LIGHT SOURCE MODULE HAVING AIRFLOW CHANNELS IN A HEAT DISSIPATION ELEMENT

CROSS-REFERENCE TO RELATED APPLICATION

This application claims the priority benefit of Taiwan application serial no. 97151126, filed on Dec. 26, 2008. The entirety of the above-mentioned patent application is incorporated herein by reference and made a part of this specification.

BACKGROUND OF THE INVENTION

1. Field of the Invention

The present invention generally relates to a light source module, and more particularly, to a light source module with a heat dissipation element.

2. Description of Related Art

Along with the increasing flourish of the electronic industry, planar displays have gradually replaced cathode ray tube displays (CRT displays) and played a major role in the mainstream display market today. Among different planar displays, the liquid crystal display (LCD) technology is quite mature and becomes popularized. Since an LCD panel is not self-luminescent, so that an LCD requires to employ a backlight module disposed under the LCD panel and serving as the display light source of the LCD panel.

A conventional planar light source serving as a backlight module normally includes a light box, a plurality of electrodes disposed on the bottom of the light box, and an insulation layer covering the electrodes. The light box includes two glass substrates, a frame, and a discharge gas. The glass substrates and the frame together form a closed chamber filled with the discharge gas. The above-mentioned planar light source works based on a luminescent mechanism. The above-mentioned luminescent mechanism is as below: a high-voltage drop is applied between the electrodes, so that the discharge gas is ionized and excited to form plasma, and then, the atoms in excited state are produced in the plasma and radiate ultraviolet light with energy. The radiated ultraviolet light further excites the fluorescent material in the planar light source so as to emit visible light.

SUMMARY OF THE INVENTION

Accordingly, the present invention is directed to a light source module having good light-emitting effect and good heat dissipation capacity.

Other objectives and advantages of the present invention should be further indicated by the disclosures of the present invention, and omitted herein for simplicity.

To achieve one of, a part of or all of the above-mentioned objectives, or to achieve other objectives, an embodiment of the present invention provides a light source module, including a planar light source, a heat dissipation medium, and a heat dissipation element. The planar light source includes a light box, a plurality of electrodes, and an insulation layer. The light box has a light emitting surface and a bottom surface opposite to the light emitting surface. The electrodes are disposed on the bottom surface. The insulation layer is disposed on the bottom surface and covers the electrodes. The heat dissipation medium is disposed on the insulation layer. The heat dissipation element includes a plurality of conductive contact portions and a conductive connection portion, wherein the conductive contact portions contact the heat dissipation medium, and the orthographic projections of the conductive contact portions on the bottom surface and the orthographic projections of the electrodes on the bottom surface are not overlapped by each other. The conductive connection portion connects the conductive contact portions, wherein a plurality of airflow channels are formed between the conductive contact portions, the conductive connection portion, and the heat dissipation medium.

Based on the described above, the embodiment of the invention has at least one of the following advantages, in the light source module of the above-mentioned embodiment, the orthographic projections of the conductive contact portions of the heat dissipation element on the bottom surface and the orthographic projections of the electrodes of the planar light source on the bottom surface are not overlapped by each other; therefore, it may be avoided that the heat dissipation element presses the electrodes to causes an inductive electric field so as to make the light emitting luminance of the planar light source ununiform. In addition, the heat energy generated by the planar light source may be carried out by using the heat dissipation medium contacting the insulation layer, the conductive contact portions contacting the heat dissipation medium, the conductive connection portion connecting the conductive contact portions, and the airflow circulating in the airflow channels.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 1 is a cross-sectional diagram of a light source module according to an embodiment of the present invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected,"

"coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

FIG. 1 is a cross-sectional diagram of a light source module according to an embodiment of the present invention. Referring to FIG. 1, in the embodiment, a light source module 100 includes a planar light source 200, a heat dissipation medium 400, and a heat dissipation element 300, wherein the light source module 100 suitably serves as a backlight module of an LCD.

The planar light source 200 includes a light box 210, a plurality of electrodes 220, and an insulation layer 230, wherein the light box 210 has a light emitting surface 212a and a bottom surface 214a opposite to the light emitting surface 212a. The electrodes 220 and the insulation layer 230 are disposed on the bottom surface 214a of the light box 210, and the insulation layer 230 covers the electrodes 220. In the embodiment, the planar light source 200 is, for example, a plasma light-emitting element.

The light box 210 of the planar light source 200 includes a first transparent substrate 212, a second transparent substrate 214, a frame 216, a plurality of spacers 218, and a discharge gas 219. The first transparent substrate 212 has a light emitting surface 212a. The second transparent substrate 214 faces the first transparent substrate 212 and has a bottom surface 214a opposite to the light emitting surface 212a. In the embodiment, the first transparent substrate 212 is, for example, a glass substrate, and the second transparent substrate 214 is, for example, a glass substrate.

The above-mentioned frame 216 of the light box 210 is disposed between the first transparent substrate 212 and the second transparent substrate 214. The spacers 218 are disposed between the first transparent substrate 212 and the second transparent substrate 214. A plurality of chambers S are formed between the first transparent substrate 212, the second transparent substrate 214, the frame 216, and the spacers 218, wherein the chambers S are filled with the discharge gas 219. The discharge gas 219 is, for example, an inert gas including xenon gas (Xe), neon gas (Ne) or argon gas (Ar).

Continuing to FIG. 1, the heat dissipation medium 400 is disposed on the insulation layer 230, wherein the heat dissipation medium 400 is, for example, heat dissipation pad, graphite sheet, conductive paste, heat dissipation adhesive or lead-free solder paste. The heat dissipation element 300 includes a plurality of conductive contact portions 310 and a conductive connection portion 320. The conductive contact portions 310 contact the heat dissipation medium 400 of the planar light source 200, and the conductive connection portion 320 connects the conductive contact portions 310 but is separated from the heat dissipation medium 400 without contacting the heat dissipation medium 400.

In the embodiment, a plurality of airflow channels 330 may be formed between the conductive contact portions 310, the conductive connection portion 320, and the heat dissipation medium 400. The extending directions of the conductive contact portions 310 are substantially perpendicular to the bottom surface 214a of the light box 210. The orthographic projections of the conductive contact portions 310 on the bottom surface 214a and the orthographic projections of the electrodes 220 on the bottom surface 214a are not overlapped by each other. The orthographic projections of the conductive contact portions 310 on the bottom surface 214a and the orthographic projections of the electrodes 220 on the bottom surface 214a are alternately disposed one after another.

In addition, an end of each of the conductive contact portions 310 connects the conductive connection portion 320, wherein the end is far away from the bottom surface 214a of the light box 210, and the conductive contact portions 310 of the heat dissipation element 300 and the conductive connection portion 320 are an integrally formed unit. In another embodiment (not shown), however, the conductive connection portion 320 may connect any place of the conductive contact portions 310 as long as the conductive connection portion 320 are separated from the heat dissipation medium 400 and do not contact the heat dissipation medium 400.

In the embodiment, since the orthographic projections of the conductive contact portions 310 on the bottom surface 214a and the orthographic projections of the electrodes 220 of the planar light source 200 on the bottom surface 214a are alternately disposed one after another, i.e., the conductive contact portions 310 are not located on the places of the insulation layer 230 wherein the places are just located respectively right over each of the electrodes 220, the conductive contact portions 310 would not press the electrodes 220. As a result, the conductive contact portions 310 may not press the electrodes 220, so that the problem of ununiform light emitting luminance of the planar light source 200 caused by an inductive electric field due to pressing the electrodes 220 by the conductive contact portions 310 may be avoided.

When a driving voltage is applied between the electrodes 220 of the planar light source 200 leading to ionize and excite the discharge gas 219 so as to produce plasma and emit visual light, the heat generated by the planar light source 200 may be carried out through the heat dissipation medium 400 contacting the insulation layer 230 and the airflow circulating in the airflow channels 330.

In summary, the embodiment of the invention has at least one of the following advantages, in the light source module of the above-mentioned embodiments of the present invention, the orthographic projections of the conductive contact portions of the heat dissipation element on the bottom surface and the orthographic projections of the electrodes of the planar light source on the bottom surface are not overlapped by each other; therefore, It may be avoided that the heat dissipation element presses the electrodes to causes an inductive electric field so as to make the light emitting luminance of the planar light source ununiform. In addition, the heat generated by the planar light source may be carried out through the heat dissipation medium contacting the insulation layer, the conductive contact portions contacting the heat dissipation medium, and the conductive connection portion connecting the conductive contact portions. In addition, the airflow circulating in the airflow channels may also contribute to carry out the heat energy generated by the planar light source.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module, comprising:
    a planar light source, comprising:
        a light box, having a light emitting surface and a bottom surface opposite to the light emitting surface;
        a plurality of electrodes, disposed on the bottom surface, a driving voltage applied between the electrodes leading to ionize and excite a discharge gas so as to produce plasma and emit visual light; and
        an insulation layer, disposed on the bottom surface and covering the electrodes;
    a non-metallic heat dissipation medium, disposed on the insulation layer; and
    a heat dissipation element, comprising:
        a plurality of conductive contact portions, contacting the heat dissipation medium, wherein the orthographic projections of the conductive contact portions on the bottom surface and the orthographic projections of the electrodes on the bottom surface are not overlapped by each other to avoid generating an inductive electric field due to pressing the electrodes by the conductive contact portions; and
        a conductive connection portion, connecting the conductive contact portions, wherein a plurality of air-flow channels are formed between the conductive contact portions, the conductive connection portion, and the non-metallic heat dissipation medium.

2. The light source module as claimed in claim 1, wherein the heat dissipation medium comprises a heat dissipation pad, a graphite sheet, a layer of conductive paste, a layer of heat dissipation adhesive or a layer of lead-free solder paste.

3. The light source module as claimed in claim 1, wherein an end of each of the conductive contact portions connects the conductive connection portion and the end is far away from the bottom surface.

4. The light source module as claimed in claim 1, wherein the conductive contact portions are an integrally formed unit.

5. The light source module as claimed in claim 1, wherein the conductive contact portions and the conductive connection portion are an integrally formed unit.

6. The light source module as claimed in claim 1, wherein the extending directions of the conductive contact portions are substantially perpendicular to the bottom surface.

7. The light source module as claimed in claim 1, wherein the orthographic projections of the conductive contact portions on the bottom surface and the orthographic projections of the electrodes on the bottom surface are alternately disposed one after another.

8. The light source module as claimed in claim 1, wherein the light box comprises:
    a first transparent substrate, having the light emitting surface;
    a second transparent substrate, facing the first transparent substrate and having the bottom surface;
    a frame, disposed between the first transparent substrate and the second transparent substrate;
    a plurality of spacers, disposed between the first transparent substrate and the second transparent substrate, wherein a plurality of chambers are formed between the first transparent substrate, the second transparent substrate, the frame, and the spacers; and
    a discharge gas, filling the chambers.

9. The light source module as claimed in claim 8, wherein the first transparent substrate comprises a glass substrate.

10. The light source module as claimed in claim 8, wherein the second transparent substrate comprises a glass substrate.

11. The light source module as claimed in claim 8, wherein the discharge gas comprises an inert gas.

12. The light source module as claimed in claim 11, wherein the inert gas comprises xenon gas, neon gas or argon gas.

* * * * *